US010755006B2

(12) United States Patent
Adam et al.

(10) Patent No.: US 10,755,006 B2
(45) Date of Patent: Aug. 25, 2020

(54) CLOUD-BASED RESERVOIR SIMULATION ENVIRONMENT

(71) Applicant: Schlumberger Technology Corporation, Sugar Land, TX (US)

(72) Inventors: Stuart Adam, Houston, TX (US); Ian Ambler, Abingdon (GB); Owen Brazell, Abingdon (GB); Neil Brown, Abingdon (GB); Miguel Meneses, Houston, TX (US); Brian Spolnicki, Katy, TX (US); Kevin Shaw, Abingdon (GB); Dayal Gunasekera, Abingdon (GB); Antonio Vieira, Jr., Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 417 days.

(21) Appl. No.: 15/536,119

(22) PCT Filed: Jan. 8, 2016

(86) PCT No.: PCT/US2016/012569
§ 371 (c)(1),
(2) Date: Jun. 14, 2017

(87) PCT Pub. No.: WO2016/112241
PCT Pub. Date: Jul. 14, 2016

(65) Prior Publication Data
US 2018/0004868 A1    Jan. 4, 2018

Related U.S. Application Data

(60) Provisional application No. 62/101,456, filed on Jan. 9, 2015.

(51) Int. Cl.
*G06F 30/20*    (2020.01)
*G06F 9/455*    (2018.01)
(Continued)

(52) U.S. Cl.
CPC .............. *G06F 30/20* (2020.01); *E21B 43/00* (2013.01); *E21B 43/25* (2013.01); *G06F 9/45558* (2013.01); *H04L 63/0428* (2013.01)

(58) Field of Classification Search
CPC ............. G06F 17/5009; G06F 11/3006; G06F 17/5036; G06F 9/5072; G06Q 10/06;
(Continued)

(56) References Cited

U.S. PATENT DOCUMENTS 9,075,788 B1 *   7/2015   Roth .................... G06F 11/3006
9,412,137 B2 *   8/2016   McLaughlin ...... G05B 19/4183
(Continued)

FOREIGN PATENT DOCUMENTS

WO    2013/165363 A1    11/2013

OTHER PUBLICATIONS

International Preliminary Report on Patentability for the equivalent International patent application PCT/US2016/012569 dated Jul. 20, 2017.
(Continued)

*Primary Examiner* — Kandasamy Thangavelu
(74) *Attorney, Agent, or Firm* — Jaime A. Castano

(57) ABSTRACT

Reservoir simulations may be executed in a high performance computing cloud cluster (530) provisioned within a cloud computing environment (450) and accessible by graphical pre- and/or post-processors (410) resident on a computer system (402) that is external to the cloud computing environment.

15 Claims, 8 Drawing Sheets

(51) Int. Cl.
*E21B 43/00* (2006.01)
*E21B 43/25* (2006.01)
*H04L 29/06* (2006.01)

(58) Field of Classification Search
CPC ... H04L 63/0823; G06T 13/20; H02L 17/007; G05B 17/20
See application file for complete search history.

(56) References Cited

U.S. PATENT DOCUMENTS

| | | | |
|---|---|---|---|
| 9,792,427 B2* | 10/2017 | Costa | H04L 63/0823 |
| 2009/0076749 A1* | 3/2009 | Nasle | G05B 17/02 |
| | | | 702/62 |
| 2010/0164974 A1 | 7/2010 | Fairclouth | |
| 2010/0250216 A1 | 9/2010 | Narr et al. | |
| 2011/0040533 A1* | 2/2011 | Torrens | E21B 44/00 |
| | | | 703/2 |
| 2011/0055385 A1* | 3/2011 | Tung | G06F 9/5072 |
| | | | 709/224 |
| 2012/0166967 A1 | 6/2012 | Deimbacher et al. | |
| 2013/0090907 A1* | 4/2013 | Maliassov | G06F 17/5009 |
| | | | 703/10 |
| 2013/0187930 A1* | 7/2013 | Millman | G06T 13/20 |
| | | | 345/473 |
| 2013/0191106 A1* | 7/2013 | Kephart | G05B 17/02 |
| | | | 703/21 |
| 2014/0000964 A1 | 1/2014 | Selman et al. | |
| 2014/0070756 A1* | 3/2014 | Kearns | H02J 7/007 |
| | | | 320/101 |
| 2014/0236559 A1* | 8/2014 | Fung | E21B 41/00 |
| | | | 703/10 |
| 2015/0006128 A1* | 1/2015 | Enenkel | G06F 17/5036 |
| | | | 703/2 |
| 2015/0006136 A1 | 1/2015 | Hinkley et al. | |
| 2015/0088480 A1* | 3/2015 | Asai | G06Q 10/06 |
| | | | 703/13 |
| 2016/0063145 A1* | 3/2016 | Chang | H04L 65/403 |
| | | | 703/6 |
| 2016/0147920 A1* | 5/2016 | Goulkhah | G06F 17/5009 |
| | | | 703/21 |

OTHER PUBLICATIONS

International Search Report for the equivalent International patent application PCT/US2016/012569 dated May 12, 2016.

* cited by examiner

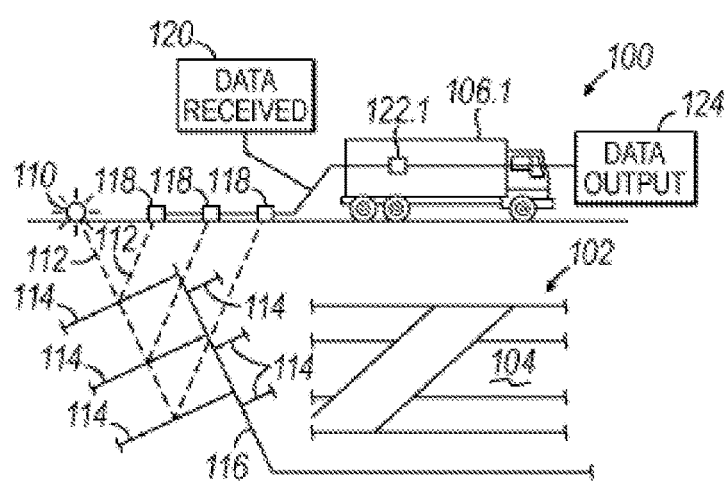
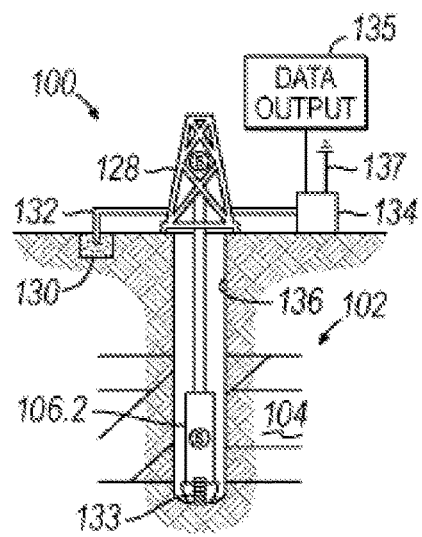
FIG. 1A  FIG. 1B
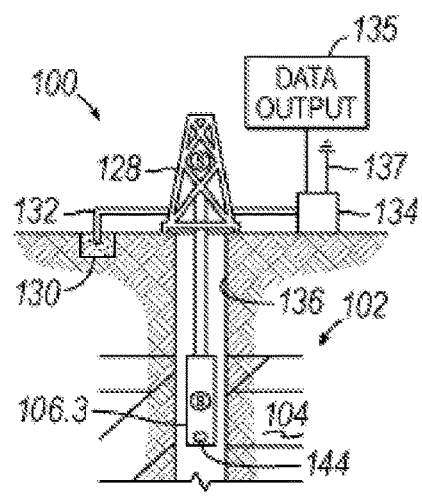
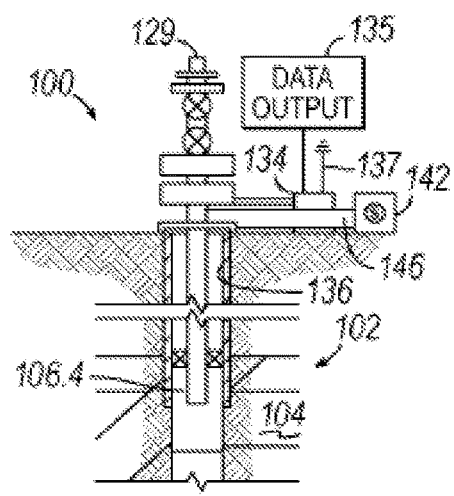
FIG. 1C  FIG. 1D

CLOUD-BASED RESERVOIR SIMULATION ENVIRONMENT

CROSS-REFERENCE TO RELATED APPLICATIONS

This application claims the filing benefit of U.S. Provisional Patent Application Ser. No. 62/101,456 filed on Jan. 9, 2015, which is incorporated by reference herein in its entirety.

BACKGROUND

Reservoir simulation generally employs a numerical solution of the equations that describe the physics governing the complex behaviors of multi-component, multiphase fluid flow in natural porous media in a reservoir and other types of fluid flow elsewhere in a production system. The complexity of the physics that govern reservoir fluid flow leads to systems of coupled nonlinear partial differential equations that are generally not amenable to conventional analytical methods. As a result, numerical solution techniques are generally used.

A variety of mathematical models, formulations, discretization methods, and solution strategies have been developed and are associated with a grid imposed upon an area of interest in a geological formation. Reservoir simulation may be used to predict production rates from reservoirs and may be used to determine appropriate improvements, such as facility changes or drilling additional wells, that may be implemented to improve production, among other uses.

Reservoir simulation, however, can be extremely computationally expensive, and complex simulations may rely upon costly, high performance computer systems to maintain runtimes within reasonable time frames. Otherwise, long runtimes associated with lower performance computer systems may adversely impact user productivity. Purchasing and maintaining high performance computing systems, however, may be beyond the budgets of some users, and as a result, a need exists in the art for providing a cost-effective solution for running complex reservoir simulations.

SUMMARY

Embodiments consistent with some aspects of the invention provide a method of running a reservoir simulation. The method may include receiving, with a high performance computing cloud cluster provisioned within a cloud computing environment, a simulation job prepared by a graphical pre-processor resident on a computer system that is external to the cloud computing environment, executing the simulation job using a reservoir simulator resident on a plurality of compute nodes in the high performance computing cloud cluster to generate simulation results, and returning the generated simulation results to a graphical post-processor resident on the computer system that is external to the cloud computing environment.

In some embodiments, the graphical pre-processor and graphical post-processor are components of an exploration and production (E&P) software platform resident on the computer system, and the computer system is a desktop computer system, a laptop computer system or a server computer system. Further, in some embodiments receiving the simulation job includes receiving at least a portion of a simulation model prepared by the graphical pre-processor. In addition, in some embodiments, the simulation job received by the high performance computing cloud cluster includes encrypted simulation job data, and the method further includes, in the high performance computing cloud cluster, decrypting the encrypted simulation job data prior to executing the simulation job to generate decrypted simulation job data, and encrypting simulation result data from the simulation results prior to returning the generated simulation results such that returning the generated simulation results includes returning the encrypted simulation result data. In some embodiments, the high performance computing cloud cluster includes a storage container within which is stored the encrypted simulation job data, where decrypting the encrypted simulation job data includes retrieving the encrypted simulation job data from the storage container and storing the decrypted simulation job data in temporary storage in the high performance computing cloud cluster, where the simulation results are stored in the temporary storage by the plurality of compute nodes, and where encrypting the simulation result data includes retrieving the simulation result data from the temporary storage and storing the encrypted simulation result data in the storage container.

Further, in some embodiments the storage container is created in response to the computer system that is external to the cloud computing environment, and the method further includes deleting the storage container after executing the simulation job and returning the generated simulation results. In addition, some embodiments further include, in the computer system that is external to the cloud computing environment, generating a simulation model and the simulation job using the graphical pre-processor, encrypting data associated with the simulation job to generate the encrypted simulation job data, creating the storage container, storing the encrypted simulation job data in the storage container, detecting the encrypted simulation result data in the storage container, receiving the encrypted simulation result data from the storage container, decrypting the encrypted simulation result data to generate decrypted simulation result data, deleting the storage container, and displaying at least a portion of the encrypted simulation result data.

Some embodiments also include provisioning the high performance computing cloud cluster in the cloud computing environment in response to a request from the computer system that is external to the cloud computing environment, while some embodiments also include creating a subscription for a user of the computer system that is external to the cloud computing environment, where provisioning the high performance computing cloud cluster is performed on behalf of the subscribed user. Further, some embodiments also include, after provisioning the high performance computing cloud cluster, establishing a direct secure connection between the high performance computing cloud cluster and the computer system that is external to the cloud computing environment.

In additional embodiments consistent with some aspects of the invention, an apparatus may include a high performance computing cloud cluster provisioned within a cloud computing environment, the high performance computing cloud cluster including a plurality of compute nodes including hardware resources from the cloud computing environment, a reservoir simulator resident on the plurality of compute nodes, and program code that may upon execution by at least one processing unit resident in the cloud computing environment receive a simulation job prepared by a graphical pre-processor resident on a computer system that is external to the cloud computing environment, initiate execution of the simulation job by the reservoir simulator to generate simulation results, and return the generated simulation results to a graphical post-processor resident on the computer system that is external to the cloud computing environment.

In some embodiments, the simulation job includes at least a portion of a simulation model prepared by the graphical pre-processor, and in some embodiments, the received simulation job includes encrypted simulation job data, and the program code is may decrypt the encrypted simulation job data prior to initiating execution of the simulation job to generate decrypted simulation job data, and encrypt simulation result data from the simulation results prior to returning the generated simulation results. Further, in some embodiments, the high performance computing cloud cluster includes a storage container within which is stored the encrypted simulation job data, where the program code may decrypt the encrypted simulation job data by retrieving the encrypted simulation job data from the storage container and storing the decrypted simulation job data in temporary storage in the high performance computing cloud cluster, where the simulation results are stored in the temporary storage by the plurality of compute nodes, and where the program code may encrypt the simulation result data by retrieving the simulation result data from the temporary storage and storing the encrypted simulation result data in the storage container. In addition, in some embodiments, the storage container may be deleted by the computer system that is external to the cloud computing environment after execution of the simulation job and return of the generated simulation results.

Some embodiments also include a management cloud resident in the cloud computing environment to provision the high performance computing cloud cluster in response to a request from the computer system that is external to the cloud computing environment, and in some embodiments, the management cloud may create a subscription for a user of the computer system that is external to the cloud computing environment, where the high performance computing cloud cluster is provisioned on behalf of the subscribed user.

In still additional embodiments consistent with some aspects of the invention, a program product may include a computer readable medium and program code stored on the computer readable medium and that may be executed by at least one processing unit of a computer system that is external to a cloud computing environment. The program code may include a graphical pre-processor and a graphical post-processor and may directly connect to a high performance computing cloud cluster provisioned within the cloud computing environment, the high performance computing cloud cluster including a plurality of compute nodes and a reservoir simulator resident on the plurality of compute nodes, generate and submit a simulation job to the high performance computing cloud cluster to cause the high performance computing cloud cluster to initiate execution of the simulation job by the reservoir simulator to generate simulation results, and receive and display the generated simulation results.

In some embodiments, the graphical pre-processor and graphical post-processor are components of an exploration and production (E&P) software platform resident on the computer system, and in some embodiments, the program code may encrypt data associated with the simulation job to generate encrypted simulation job data, create a storage container in the high performance computing cloud cluster, store the encrypted simulation job data in the storage container, detect encrypted simulation result data stored in the storage container in response to execution of the simulation job by the reservoir simulator, receive the encrypted simulation result data from the storage container, decrypt the encrypted simulation result data to generate decrypted simulation result data, delete the storage container, and display at least a portion of the encrypted simulation result data.

Further, in some embodiments, the program code comprises first program code, and the program product further includes second program code that upon execution by at least one processing unit in the high performance computing cloud cluster receives the submitted simulation job, initiates execution of the submitted simulation job by the reservoir simulator to generate the simulation results, and returns the generated simulation results. In addition, in some embodiments the submitted simulation job includes encrypted simulation job data, and the second program code may further decrypt the encrypted simulation job data prior to initiating execution of the simulation job to generate decrypted simulation job data, and encrypt simulation result data from the simulation results prior to returning the generated simulation results.

Moreover, in some embodiments, the high performance computing cloud cluster includes a storage container within which is stored the encrypted simulation job data, the second program code may decrypt the encrypted simulation job data by retrieving the encrypted simulation job data from the storage container and storing the decrypted simulation job data in temporary storage in the high performance computing cloud cluster, the simulation results may be stored in the temporary storage by the plurality of compute nodes, and the second program code may encrypt the simulation result data by retrieving the simulation result data from the temporary storage and storing the encrypted simulation result data in the storage container.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter

BRIEF DESCRIPTION OF THE DRAWINGS

FIGS. 1A-1D illustrate simplified, schematic views of an oilfield having subterranean formations containing reservoirs therein in accordance with implementations of various technologies and techniques described herein.

DETAILED DESCRIPTION

Figure 2:
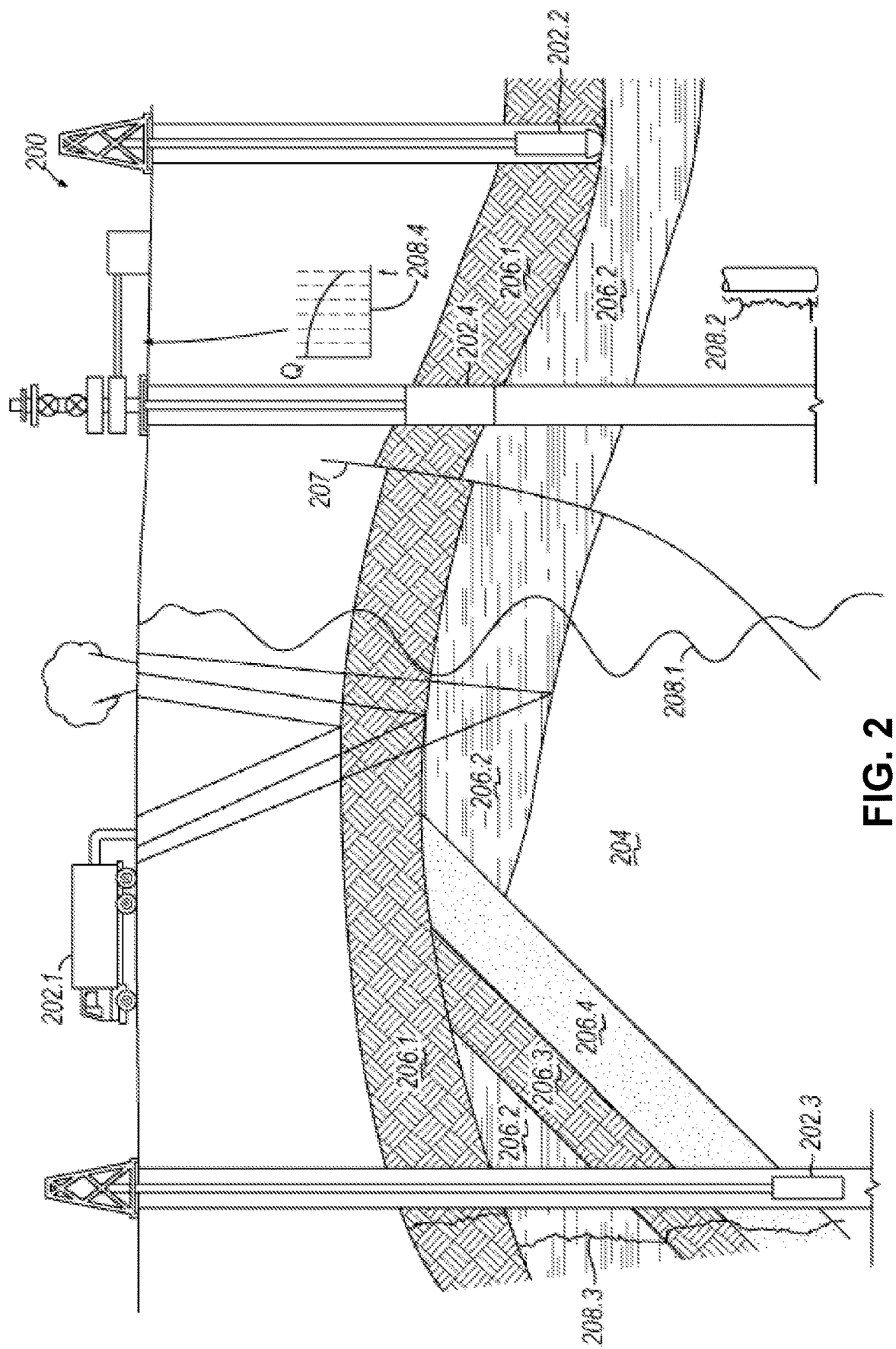
FIG. 2 illustrates a schematic view, partially in cross section of an oilfield having a plurality of data acquisition tools positioned at various locations along the oilfield for collecting data from the subterranean formations in accordance with implementations of various technologies and techniques described herein.

In the embodiments discussed hereinafter, reservoir simulations may be executed in a high performance computing cloud cluster provisioned within a cloud computing environment and accessible by graphical pre- and/or post-processors resident on a computer system that is external to the cloud computing environment. Prior to a discussion of these embodiments, however, a brief overview of oilfield operations are provided below.

Oilfield Operations

FIGS. 1A-1D illustrate simplified, schematic views of an oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 3:
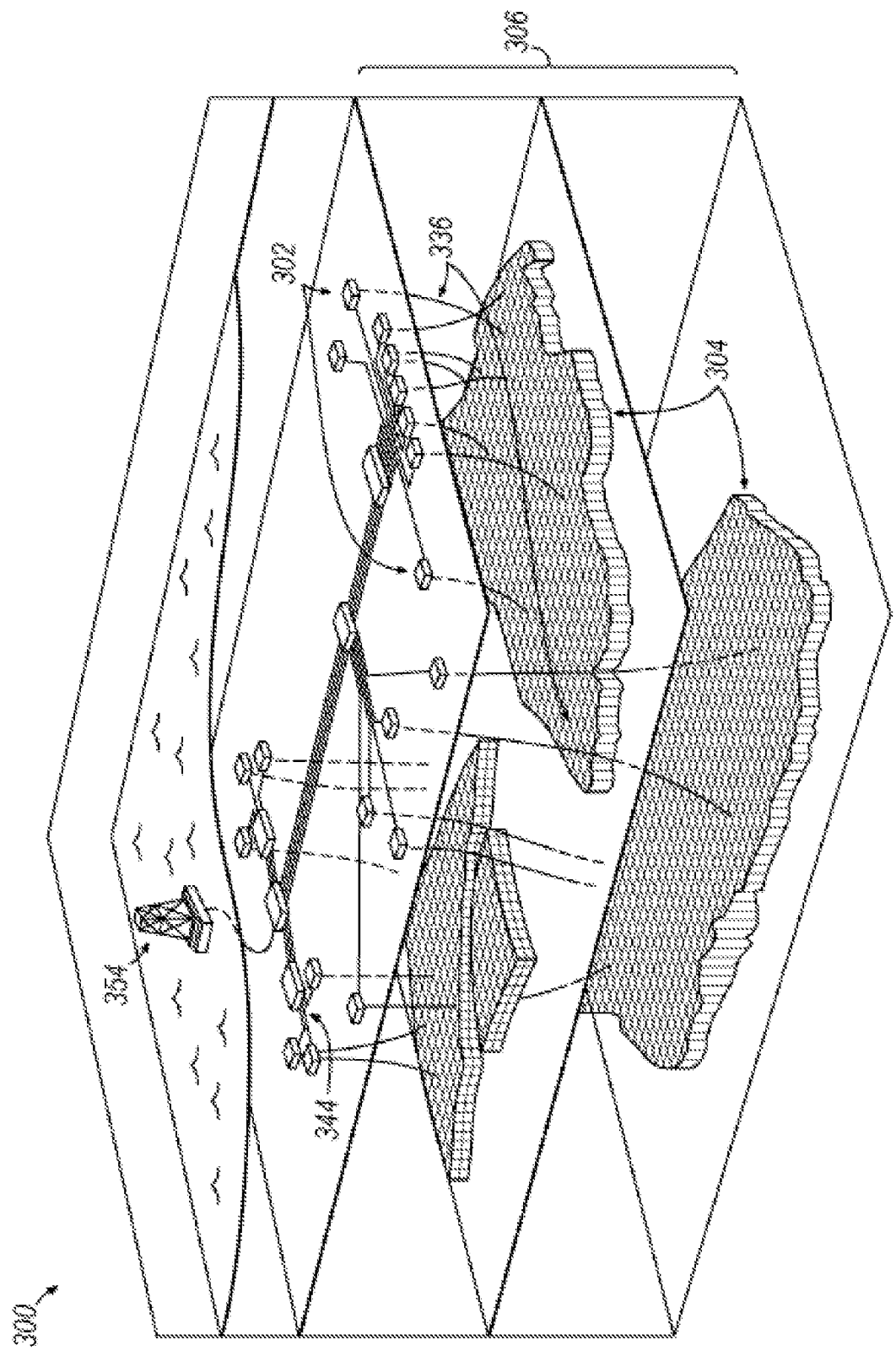
FIG. 3 illustrates a production system for performing one or more oilfield operations in accordance with implementations of various technologies and techniques described herein.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Cloud-Based Reservoir Simulation Environment

As noted above, embodiments consistent with the invention may execute reservoir simulations in a high performance computing cloud cluster provisioned within a cloud computing environment and accessible by graphical pre- and/or post-processors resident on a computer system that is external to the cloud computing environment.

Figure 4:
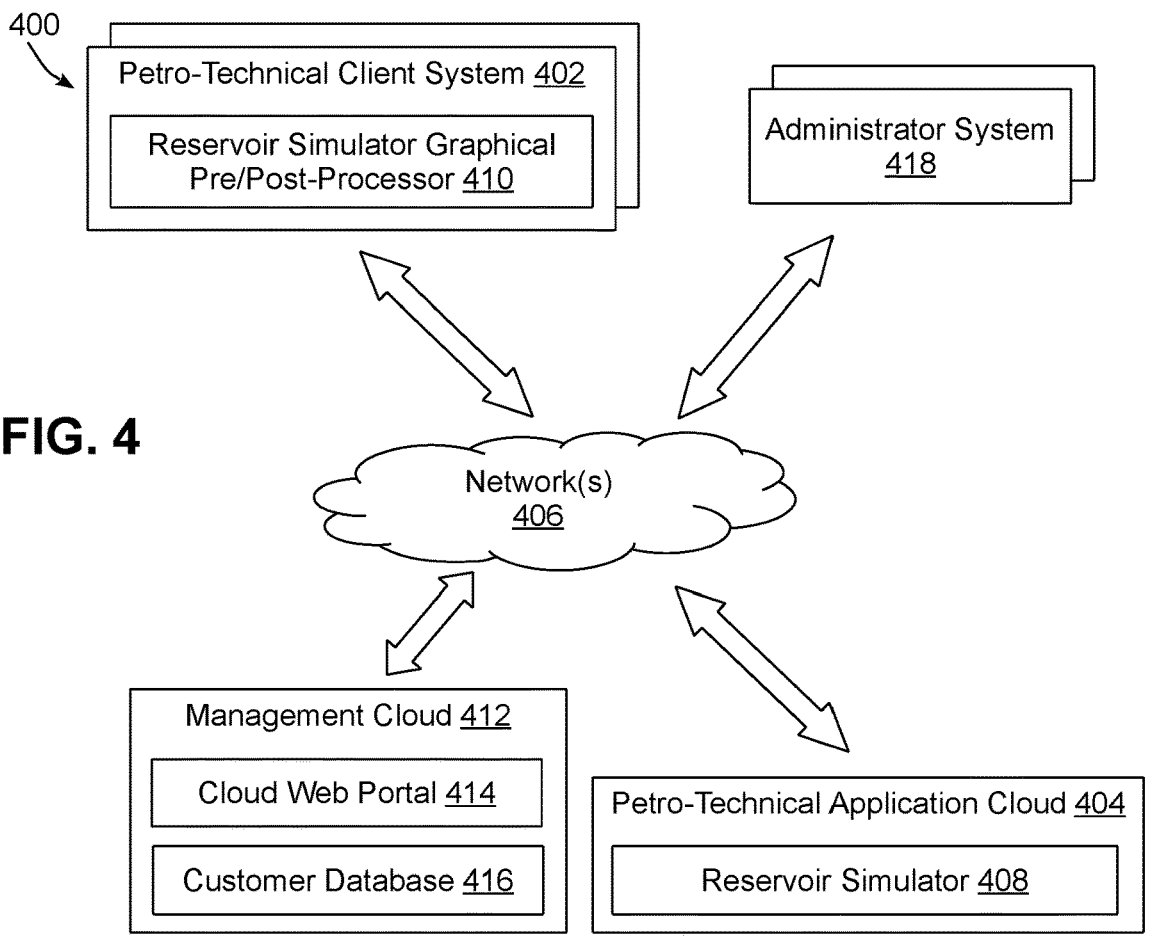
FIG. 4 is a block diagram of an example hardware and software environment for a data processing system in accordance with implementation of various technologies and techniques described herein.

FIG. 4, for example, illustrates an example data processing system 400 in which the various technologies and techniques described herein may be implemented. System 400 may incorporate, for example, one or more petro-technical client computer systems 402 capable of accessing a petro-technical application cloud 404 via one or more networks 406. A reservoir simulator 408 may be resident in petro-technical application cloud 404 for use in executing reservoir simulations submitted by a client computer system 402, e.g., via a reservoir simulator graphical pre/post-processor 410. In addition, a separate management cloud 412 may be utilized to provide external access to a client web portal 414 and customer database 416, the former of which may be accessed by client computer system(s) 402 and the latter of which may be accessed by one or more administrators, e.g., via an administrator computer system 418. The use and configuration of each of these components will be discussed in greater detail below.

Computer systems 402, 418 may be implemented as various types of computers, e.g., desktop computers, laptop computers, tablets, mobile devices, etc. In some embodiments, such computer systems may be implemented as server-type computers, and further, in some embodiments multiple networked computer systems may be used to support a particular client, customer or administrator, e.g., through a client-server architecture, a web-based architecture, a remote desktop architecture, a virtual machine architecture, etc. Computer systems 402, 418, as such, may be implemented using practically any type of computer that may be external to but otherwise capable of interacting with a cloud computing environment.

Figure 5:
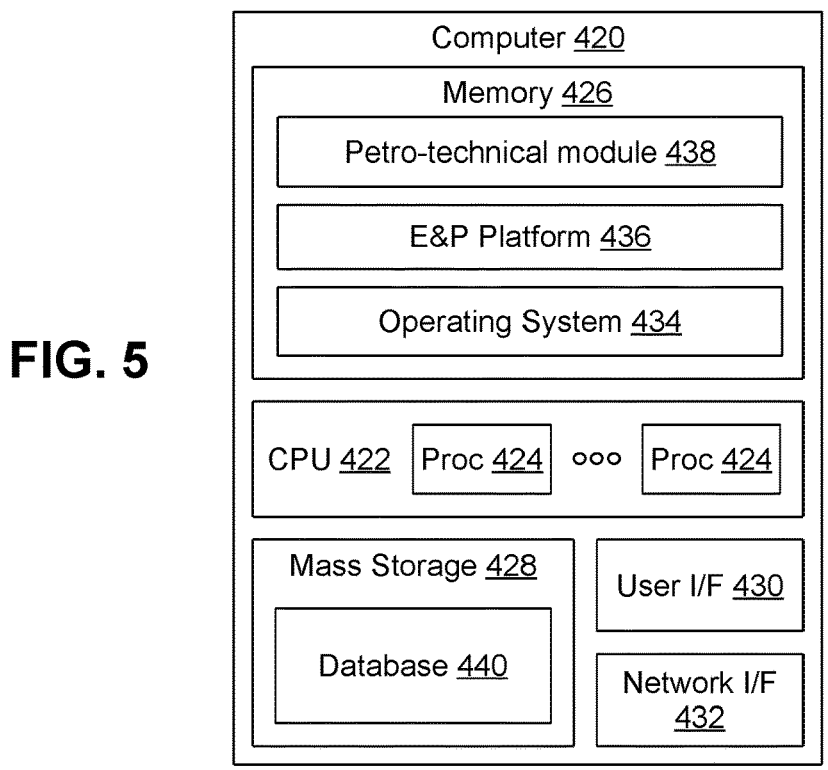
FIG. 5 is a block diagram of an example hardware and software environment for the client system referenced in FIG. 4.

FIG. 5, for example, illustrates an example computer 420 that may be used to implement either of computer systems 402, 418 in some embodiments. Computer 420 may include a central processing unit (CPU) 422 including at least one hardware-based processor or processor core 424. CPU 422 is coupled to a memory 426, which may represent the random access memory (RAM) devices comprising the main storage of a computer 420, as well as any supplemental levels of memory, e.g., cache memories, non-volatile or backup memories (e.g., programmable or flash memories), read-only memories, etc. In addition, memory 426 may be considered to include memory storage physically located elsewhere in a computer, e.g., any cache memory in a microprocessor or processing core, as well as any storage capacity used as a virtual memory, e.g., as stored on a mass storage device 428 or on another computer coupled to a computer 420.

Computer 420 also generally receives a number of inputs and outputs for communicating information externally. For interface with a user or operator, computer 420 generally includes a user interface 430 incorporating one or more user input/output devices, e.g., a keyboard, a pointing device, a display, a printer, etc. Otherwise, user input may be received, e.g., over a network interface 432 coupled to a network, from one or more external computers. Computer 420 also may be in communication with one or more mass storage devices 428, which may be, for example, internal hard disk storage devices, external hard disk storage devices, storage area network devices, etc.

Computer 420 generally operates under the control of an operating system 434 and executes or otherwise relies upon various computer software applications, components, programs, objects, modules, data structures, etc. For example, a petro-technical module or component 438 executing within an exploration and production (E&P) platform 436 may be used to access, process, generate, modify or otherwise utilize petro-technical data, e.g., as stored locally in a database 440 and/or accessible remotely (e.g., from a collaboration platform). Platform 436 and/or one or more petro-technical modules 438 may, in some embodiments, implement graphical pre- and/or post-processing in connection with cloud-based reservoir simulation as described herein. In one non-limiting embodiment, for example, E&P platform 436 may implemented as the PETREL Exploration & Production (E&P) software platform, which may further access a collaboration platform such as the STUDIO E&P KNOWLEDGE ENVIRONMENT platform, both of which are available from Schlumberger Ltd. and its affiliates. It will be appreciated, however, that the techniques discussed herein may be utilized in connection with other platforms and environments, so the invention is not limited to the particular software platforms and environments discussed herein.

Figure 6:
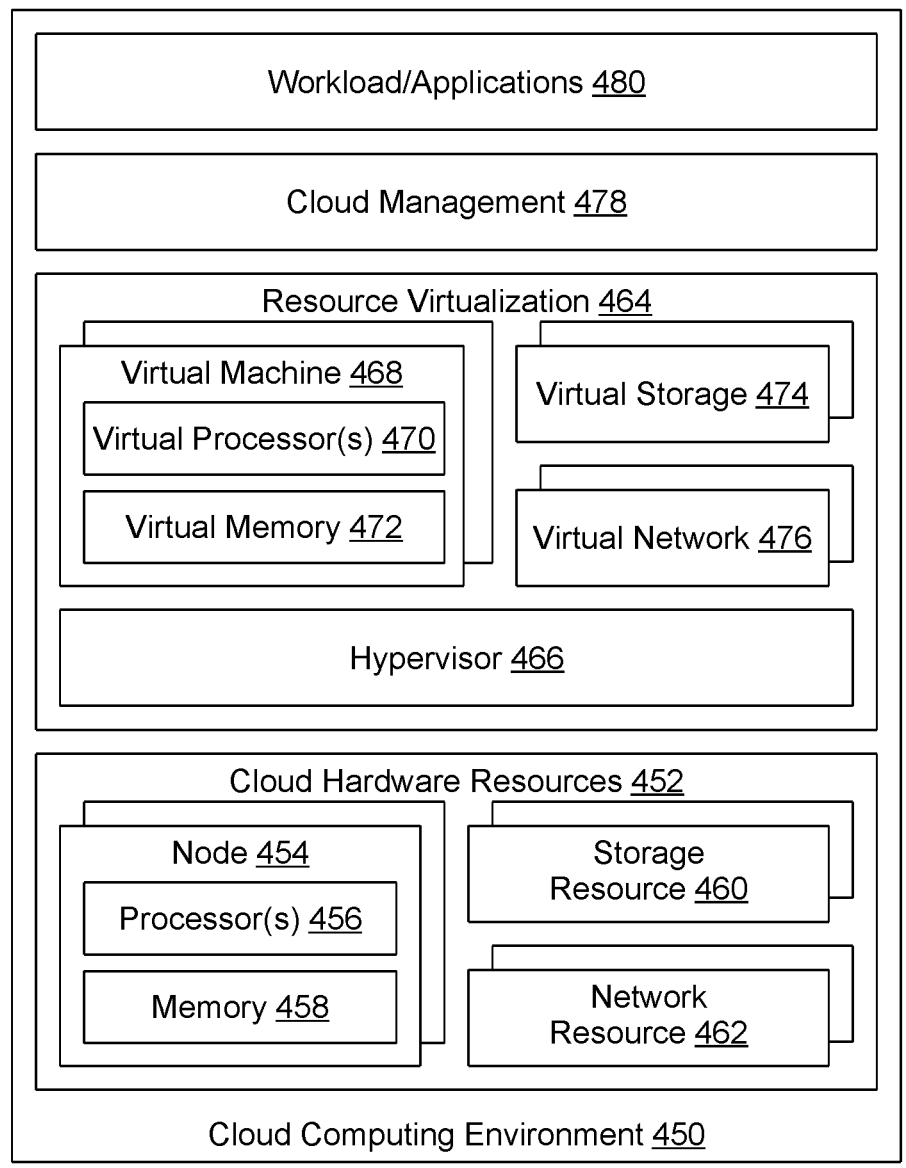
FIG. 6 is a block diagram of an example cloud computing environment suitable for implementing the management cloud and/or petro-technical application cloud referenced in FIG. 4.

Returning to FIG. 4, each of petro-technical application cloud 404 and management cloud 412 may be implemented as a cloud computing environment, an example of which is illustrated at 450 in FIG. 6. In cloud computing environment, a set of cloud hardware (physical) resources 452, e.g., computing resources (represented by a plurality of compute nodes 454 that include both processor resources 456 and memory resources 458), storage resources 460 and network resources 462 are generally virtualized by resource virtualization and cloud management functionality to provision one or more "clouds" for access by different users, thereby providing a service offering on-demand access to a shared pool of configurable computing resources that can be provisioned and released with minimal management effort or interaction with a provider of the service. Clouds may generally be public, private or hybrid in nature, and it will be appreciated that any number of cloud computing environments and/or services may be utilized in different embodiments of the invention.

Various abstraction layers may be employed in cloud computing environment 450. For example, a resource virtualization layer 464 may be used to virtualize the cloud hardware resources 452, e.g., using one or more hypervisors or virtual machine monitors 466 to create and manage virtual machines 468 including virtual processors 470 and virtual memory 472, as well as virtual storage 474 and/or virtual networks 476 that may be utilized by the virtual machines 468. It will be appreciated that the cloud hardware resources 452 may be implemented using a wide variety of architectures, including mainframes, servers, blade servers, supercomputers, and practically any other hardware architecture used in connection with virtualization, and may be arranged into various groupings such as nodes, hosts, groups, pools, racks, units, data centers, etc. In addition, a cloud management layer 478 may be used to manage cloud-related functionality such as the provisioning and/or management of clouds, customer/client management, billing, security management, authentication, etc. Collectively, for example, resource virtualization layer 464 and cloud management layer 478 may be used to provision hardware resources and implement a cloud on behalf of a customer, thereby enabling various workloads (e.g., one or more applications) 480 to be installed and executed in the implemented cloud.

In one example embodiment, for example, workload 480 may include a reservoir simulator or other petro-technical application, e.g., the INTERSECT high-resolution reservoir simulator available from Schlumberger Ltd. and its affiliates. In addition, while cloud computing environment 450 is suitable for hosting both management cloud 412 and petro-technical application cloud 404 in the illustrated embodiment, it will be appreciated that different types and/or quantities of hardware resources may be provisioned for these different tasks. As will become more apparent below, for example, a petro-technical application cloud 404 in some embodiments may be provisioned with high performance hardware resources suitable for handling reservoir simulation workloads, e.g., a high performance computing (HPC) cluster of high performance compute nodes interconnected by high speed interconnects, e.g., using the InfiniBand or another high speed networking protocol. As such, petro-technical application cloud 404 may also be referred to herein as an HPC cloud cluster.

In general, the routines executed to implement the embodiments disclosed herein, whether implemented as part of an operating system, kernel, middleware, hypervisor, firmware, or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers, computer systems and computing environments, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIGS. 4-6 is not intended to limit the invention. Indeed, those skilled in the art will recognize that other alternative hardware and/or software environments may be used without departing from the scope of the invention.

Returning again to FIG. 4, in some embodiments consistent with the invention, a reservoir simulator 408 or other petro-technical application may be provisioned within a petro-technical application cloud 404, and may be combined with a graphical pre/post-processor 410 resident in a client computer system 402 external to the provisioned cloud 404 to provide a services offering that leverages flexibility and economies of scale for running complex reservoir simulation models generally from any location, and without the need of a dedicated compute infrastructure. In some embodiments consistent with the invention, for example, a service offering may be implemented using public and/or private high performance cloud computing environments for reservoir simulation.

In addition, management cloud 412 may be used to provide a cloud web portal 414 for customer registration and subscription using a client computer system 402, as well as for administration and user entitlements management by an administrator from an administrator system 418. Management cloud 412 may also maintain a customer database 416 to maintain customer subscriptions, manage provisioning of cloud service infrastructure, handle billing and cost tracking, etc.

Further, as will be discussed in greater detail below, once a cloud 404 is provisioned for a customer, a simulation model may be prepared by that customer using graphical pre/post-processor 410 and packaged into a simulation job that may be submitted to the cloud 404 for execution thereby. In some embodiments, data security is also provided during transfer of data to and from the cloud, when data is at rest on the cloud and while the simulation job is executing on the cloud, and in some embodiments, job status reporting and monitoring may be supported during simulation execution. Once a simulation is complete, results may be returned and displayed by graphical pre/post-processor 410.

In some embodiments, a services offering may include each of product licensing, cloud resources and support components suitable for running complex reservoir simulations on provisioned HPC cloud clusters in a cloud computing environment, while enabling customers to prepare simulation models, submit simulation jobs and/or view and analyze simulation results using computer systems that are local to the customers or otherwise external to the cloud computing environment. A subscription process may be provided to allow customers to sign-up for specific services, and once a service request is approved by a customer and an account manager for a provider of a cloud-based reservoir simulation environment, resources may be set up for the customer and entitlements may be granted to allow customers to submit simulation jobs. Customers may also in some embodiments have the ability to monitor their running jobs, get support and manage their subscriptions through an interactive web dashboard provided by a cloud-based reservoir simulation environment provider.

Further, in one embodiment, cloud web portal 414 may provide an ability for a customer to register or access as a valid customer within customer database 416. The workflow may be integrated into existing workflows managed by a reservoir simulation provider, and cloud web portal 414 may also provide an ability for registered customers to subscribe to cloud services. The workflow may generate a quote request which may be sent by email or other forms of communication to an account manager in order to manually create a quote (e.g., using a quotations and licensing tool such as SEACOLT available from Schlumberger, Ltd.) and return the quote to the customer for approval. Once the customer approves the quote (e.g., by sending a signed softcopy of the quote/contract/purchase order), the account manager may update the status of the order in cloud web portal 414. Cloud web portal 414 may also provide the ability to list all available services and offer it to customers when a user is signing-up for services.

Administration and user entitlements management may be supplied through cloud web portal 414, and may provide the ability to keep track of customer activities, including sign-up, access to services, applications, etc. As such, cloud web portal 414 may also provide an ability to customers to cancel active subscriptions based on current terms and conditions of the contract for services, provide the ability to redirect to a separate registration workflow/site for customer database 416 when a new customer wants to register, provide the ability to an existing customer with a valid subscription to add or remove additional customer (s) from the same company into the subscription, and provide the ability to send an automated email message to an account manager once a user signs up for a subscription service.

Cloud web portal 414 may also provide the ability to send an automated email message to a cloud administrator once the subscription service is approved by an account manager for provisioning, provide an ability to send automated emails to the customer when each part of the service provisioned is completed, provide an ability to display to the customer active subscriptions and remaining time once services are provisioned, provide an ability to generate usage reports based on customer usage of the services provisioned from the provider, provide an ability to keep track of all users activities, including sign-up, access to services, applications, etc., and provide reporting capabilities for resource usage and automated billing, among other functions. Further, cloud web portal 414 may also support additional administration functionality such as credential services, export compliance, billing, cost management, etc. Implementation of the aforementioned functionality would be apparent to one of ordinary skill in the art having the benefit of the instant disclosure.

Figure 7:
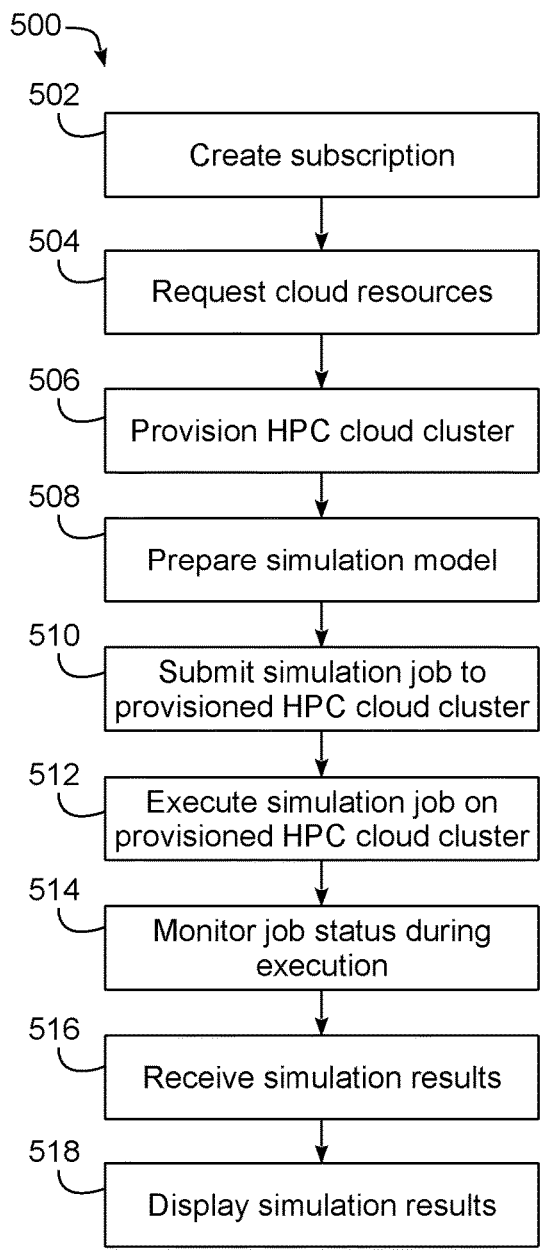
FIG. 7 illustrates a flowchart of an example sequence of operations for performing cloud-based reservoir simulation in the data processing system of FIG. 4.

Now turning to FIG. 7, this FIR illustrates an overall workflow 500 from customer subscription request to simulation results visualization for an example embodiment of the invention. For example, as illustrated in block 502, a customer may make a subscription request through cloud web portal 414, which may be reviewed by a provider, e.g., by an account manager. Precedent to making such a request, a customer may also log in or register to client web portal 414.

Once approved, and after entering into an agreement (e.g., via a paper contract or electronic agreement), a customer may then request provisioning of a cloud, e.g., by requesting cloud resources in block 504 through client web portal 414. A customer may request, for example, a particular type or size of HPC cloud cluster, particular amounts or types of computing resources, e.g., numbers and/or types of compute nodes, processors, storage resources, or network resources, amounts of memory and/or storage, etc. A customer may also request particular software or applications to be installed and operational in the HPC cloud cluster, e.g., to request an HPC cloud cluster with 8 compute nodes and running a high resolution reservoir simulator, e.g., the INTERSECT high resolution reservoir simulator. It will be appreciated that in some embodiments customers may be presented with a limited set of predetermined service offerings from which they can select, e.g., to request a medium-sized HPC cloud cluster with a particular suite of software pre-installed therein.

Next, in block 506, high performance computing (HPC) resources may be provisioned for the customer. A software cloud administrator for a cloud-based reservoir simulation environment provider may provision a suitable environment for a customer as per an approved request from an account manager. In various embodiments, such a process may be handled automatically, or may be handled manually without any interaction with cloud provisioning engines. Provisioning may include provisioning of compute nodes, storage and/or connectivity.

In some embodiments, an Azure cloud infrastructure available from Microsoft Corporation may be used, and nodes provisioned on the Azure cloud infrastructure may be selected to have InfiniBand or better connectivity to be compliant with the simulation platform operating requirements. In addition, it may be desirable in some embodiments for connectivity from the cloud infrastructure to external networks such as the Internet to be sufficient in each datacenter to support multiple users uploading large reservoir simulation models (e.g., up to 20M cells at a given time). Furthermore, datacenters may be present in the geographies where a customer requests services in some embodiments, and it may be desirable in some embodiments for the cloud infrastructure to be capable of provisioning independent storage containers (e.g., up to 200 Gb) to store datasets while simulations are executed on the compute nodes. It may also be desirable in some embodiments to support multiple instances or nodes with at least 32 Gb of assigned VRAM and proper InfiniBand connectivity guaranteed.

In some embodiments, a reliable and fast transfer mechanism or service may be included in order to support large data uploads (e.g., up to 7.5 Gb) from the customer's own environment, and support for multi-tenancy of HPC nodes for each of the customer's or an equivalent model may be provided to support independent environments for each customer provisioned environment. It may also be desirable in some embodiments to support a provider's ability to auto-provision reservoir simulator head and compute nodes within a particular time frame after subscription, and to support provisioning of instances based on an image/template of a reservoir simulation platform. It may also be desirable in some embodiments to support secure deletion and shredding of data once the instances/nodes are deleted from the infrastructure. The instances may be deleted, for example, upon decommissioning of services that had been provisioned.

As such, in some embodiments, provisioning may result in the generation of an HPC cloud cluster having a set of provisioned hardware resources and software that have previously been tested and certified to be suitable for the customer's requested workload, and may involve, for example, the selection of types and quantities of physical resources appropriate for the intended workflow, as well as selection of tested and verified images/templates suitable for providing the workload functionality requested by the customer. Provisioning may also include initialization, software installation, configuration and testing of the HPC cloud cluster, as well as granting access to the HPC cloud cluster by the customer (e.g., via creating accounts and/or installing digital certificates). In the illustrated embodiment, it may also be desirable to provide a direct connection between a customer and a provisioned HPC cloud cluster to both optimize performance and secure a customer's confidential data, so once an HPC cloud cluster is provisioned for a customer, the customer may log in to the HPC cloud cluster directly in order to submit simulation jobs, monitor job status, and receive simulation results.

Thereafter, authenticated users may login based on their subscription and submit jobs (e.g., via a script) and upload data to the HPC cloud cluster to run a reservoir simulation. Processed result data may then be returned to the user for post-processing and/or review.

In particular, in block 508, a simulation model may be prepared external to the HPC cloud cluster, e.g., using a graphical pre-processor such as supported by the PETREL E&P software platform. It will be appreciated that, within the context of reservoir simulation, a graphical pre-processor may include various software tools and functions suitable for creating a simulation model and/or simulation job for submission to a reservoir simulator. Pre-processing may include, for example, creating a description of a reservoir, well locations and/or trajectories, production and/or injection profiles and/or production targets, as well as other operations that ultimately result in the generation of a simulation model for the reservoir. Such pre-processing may also include data interpretation and other activities that characterize the structure of the reservoir and the surrounding subsurface formation.

Post-processing, in contrast, refers to visualizing, interpreting, and otherwise analyzing simulation results. A graphical post-processor, for example, may include various software tools and functions suitable for analyzing simulation results. In the illustrated embodiment, a combined graphical pre- and post-processor, e.g., as provided by the PETREL E&P software platform, may be used, and in some embodiments, the same component may be considered to be a pre-processor as well as a post-processor. In other embodiments, however, separate pre- and post-processors may be used, and separate computer systems may be used to generate a simulation model, submit a simulation job, and/or analyze simulation results. Thus, the invention is not limited to customer interaction with an HPC cloud cluster using a combined pre/post-processor resident on a single client computer system.

Once the simulation model is prepared in block 508, a simulation job may be prepared and submitted to the provisioned HPC cloud cluster in block 510. For example, a customer may use a graphical pre/post-processor to export a simulation model and one or more simulation cases in a format suitable for the reservoir simulator resident in the HPC cloud cluster, and then upload the data to the HPC cloud cluster as a simulation job. The submitted simulation job may then be executed by the provisioned HPC cloud cluster in block 512, and as illustrated in block 514, job status may be monitored during the execution, e.g., using monitoring functionality in the HPC cloud cluster. In some embodiments, support may be provided for an ability to submit, monitor and control simulations to an HPC cloud cluster directly with an E&P platform or from a simulation launcher tool.

Upon completion of the simulation, simulation results may be received by the customer in block 516 and displayed or otherwise visualized in block 518. In addition, the simulation results may be used to modify the simulation model and/or prompt further simulation job submissions. As noted above, results retrieval and display may be performed in some embodiments using the same graphical pre- and post-processor (e.g., the PETREL E&P software platform).

Figure 8:
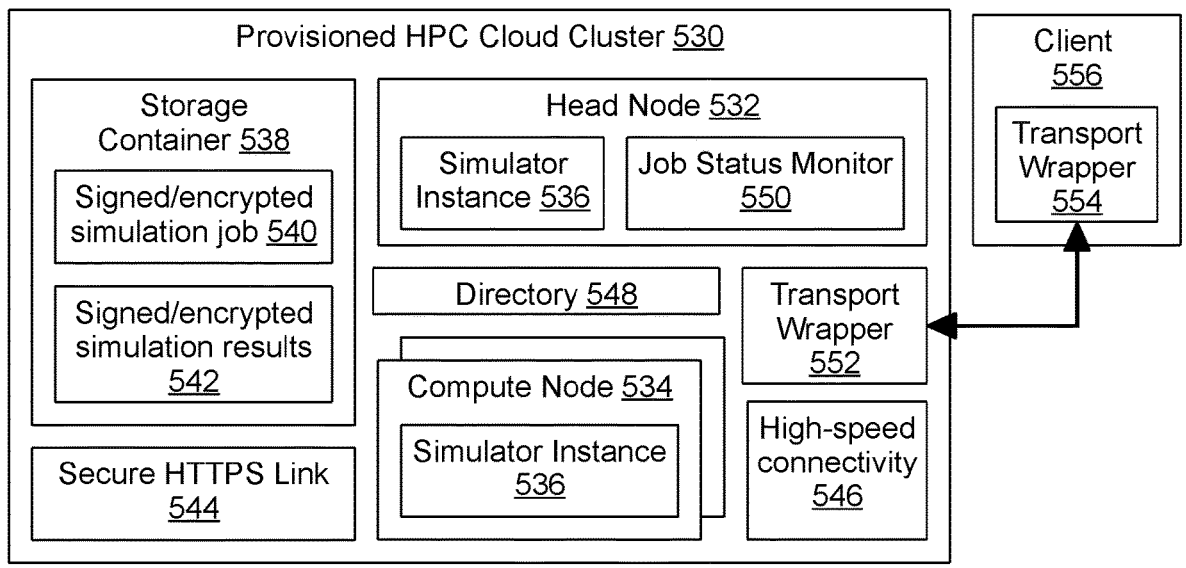
FIG. 8 is a block diagram of an example HPC cloud cluster provisioned in the workflow of FIG. 7.

FIG. 8 next illustrates an example HPC cloud cluster 530 that may be provisioned within a cloud computing environment consistent with the invention. HPC cloud cluster 530 may include, for example, a head node 532 and a plurality of compute nodes 534, which collectively represent the computing resources provisioned for the HPC cloud cluster. A plurality of simulator instances 536 are resident in head node 532 and compute nodes 534, and a storage container, e.g., a Binary Large Object (BLOB) storage container 538, may be used to store both simulation jobs 540 and simulation results 542, and may be created in a manner described below in provisioned storage for the HPC cloud cluster (e.g., in a BLOBstore). A secure HTTPS link 544 may also be supported to enable a customer to access the HPC cloud cluster in a secure manner, and for the purposes of configuring the nodes of the HPC cloud cluster for handling simulation, high-speed connectivity 546 (e.g., InfiniBand interconnects) is also provisioned in the HPC cloud cluster.

A directory 548 or other storage may also be provisioned in HPC 530 to provide for temporary storage of simulation data and results in an unencrypted format. In the illustrated embodiment, for example, it may be desirable to maintain all simulation data and results (e.g., job 540 and results 542) in a signed and encrypted state in storage container 538. For example, in connection with submitting a simulation job, it may be desirable to access a software as service (SAS) service to obtain a SAS access key and communicate with cloud infrastructure storage services in order to create storage container 538, and to store in the container the input case data for the simulation in an encrypted format. When a simulation is run, head node 532 may then decrypt the input case data and temporarily store the decrypted data in directory 548 for use by the simulation instances 536 when performing the simulation. In addition, once the simulation is complete, it may be desirable for simulation results that are also written to the directory in by the simulation instances 536 to be stored in storage container 538 in an encrypted format by head node 532, and thereafter enable a customer to retrieve and decrypt results locally on the customer's computer for importing, visualization and/or analysis, such that confidential simulation data is maintained in an encrypted format both when stored in the storage container and when communicated between the HPC cloud cluster and the customer's computer system. In addition, upon the completion of a simulation job and/or upon deprovisioning of an HPC cloud cluster, it may be desirable to support secure deletion and shredding of the storage container and any other relevant storage provisioned for the HPC cloud cluster.

Additional functionality may also be supported in HPC cloud cluster 530 in some embodiments of the invention. For example, support may be provided for federation of Windows Active Directory (AD) with a cloud-based reservoir simulation environment provider provided mechanism (e.g., customer database 416 of FIG. 4). In addition, in some embodiments, support may be provided for cloud infrastructure and data centers to be secured by double layer perimeter firewalls or by using an industry standard design and practices.

As another example, and as represented by job status monitor 550, job status reporting while the simulation is progressing in the cloud infrastructure may be supported, e.g., providing the ability to interface to web page presented by head node 532 to display the status of ongoing simulation jobs for each customer in an easily digestible way. Support may also be provided for mobile browsers on portable devices such as mobile phones, tablets, etc. for viewing subscription details, access information and the possibility to monitor simulation job queues running on an HPC cloud cluster. A job monitoring utility provided either by using HPC pack tools or a platform load sharing facility (LSF) may also be supported in order to allow customers to monitor the activity of the submitted jobs through a web Interface on cloud web portal 414. Such a utility may allow customers to check the status of jobs and cancel any job in the queue as needed. A job scheduling utility provided either by using HPC pack tools or an LSF may also be supported in order to manage a queuing system and let customers submit simulations and queue them on head node 532 for processing on compute nodes 534. Additional utilities may be provided in some embodiments to record user activities in a log file or audit trail when using the HPC cloud cluster (e.g. user login accepted, job started at a given time, job failed, etc.).

In the illustrated embodiment, head node 532 may also serve as a compute node, with additional functionality for managing the transfer of simulation data to and from storage container 538, monitoring for pending jobs, initiating simulations, and providing job status information via monitor 550.

HPC cloud cluster 530 may also include a transport wrapper 552, which may be configured as a process or daemon that interacts with a corresponding transport wrapper 554 installed in a customer's client computer system 556 to communicate simulation data therebetween. In one embodiment, for example, each transport wrapper 552, 554 is implemented using the ECLRUN tool available from Schlumberger, Ltd. and its affiliates, and may respectively be called by head node 532 and graphical pre/post-processor 410 (FIG. 4) to initiate the communication of data between the HPC cloud cluster and a client computer system.

Other components may be provisioned within HPC cloud cluster 530 in other embodiments of the invention, so the invention is not limited to the particular components illustrated in FIG. 8.

Figure 9:
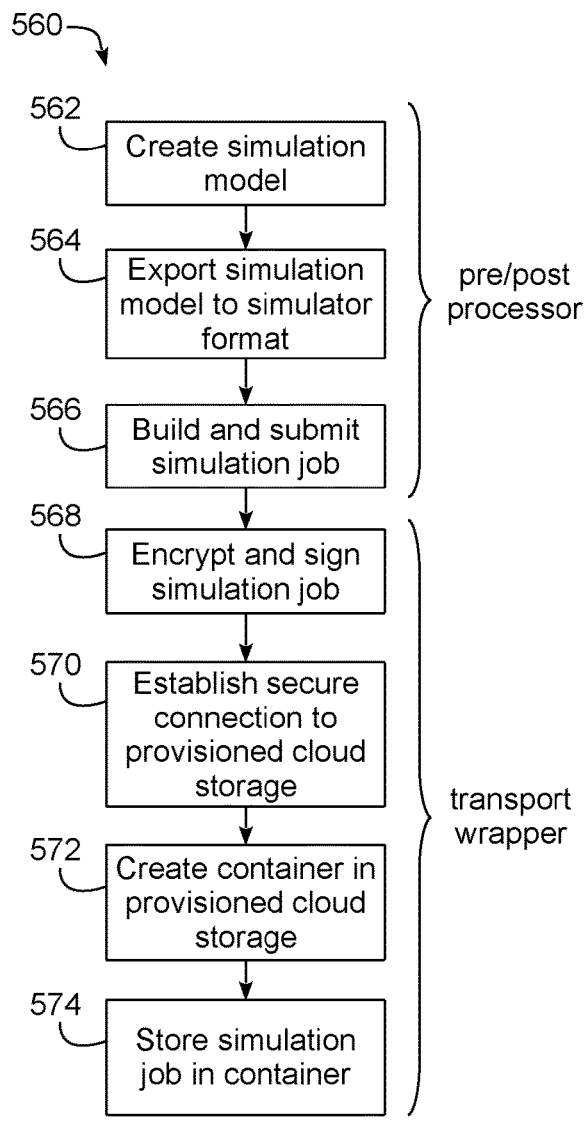
FIG. 9 illustrates a flowchart of an example sequence of operations for creating and submitting a simulation job in the data processing system of FIG. 4.

FIG. 9 next illustrates an example sequence of operations 560 for creating and submitting a simulation job to HPC cloud cluster 530 on a customer's client computer system, and includes blocks 562-566 that may be performed using a graphical pre/post-processor (e.g., pre/post-processor 410 of FIG. 4), as well as blocks 568-574 that may be performed by transport wrapper 554 of FIG. 8. First, in block 562, a simulation model is created, and then in block 564, the simulation model is exported to an appropriate format for the reservoir simulator, and in block 566, a simulation job is built and submitted using an interface supplied by the graphical pre/post-processor. To submit the simulation job, the graphical pre/post-processor calls the transport wrapper, and in block 568, the transport wrapper encrypts and digitally signs the simulation job. The transport wrapper then establishes a secure connection to provisioned cloud storage for the HPC cloud cluster (e.g., using link 544) in block 570 and then in block 572 creates a storage container (e.g., storage container 538) in the provisioned cloud storage. Then, the simulation job is communicated to the HPC cloud cluster and stored in the created storage container in block 574, and submission of the job is complete.

It will be appreciated that in some embodiments, blocks 562-566 may be performed using substantially the same end-user operations that may be used to submit a simulation job to a local or other non-cloud reservoir simulator. In some embodiments, for example, a graphical pre/post-processor may be configured to target a remote processing queue for the HPC cloud cluster such that from the user's perspective the submission of the simulation job is no different from a submission to a local reservoir simulator. In addition, in some embodiments, multiple simulation targets may be supported by a graphical pre/post-processor, whereby a user may simply select from different potential reservoir simulators, e.g., a local reservoir simulator or a cloud-based reservoir simulator.

Figure 10:
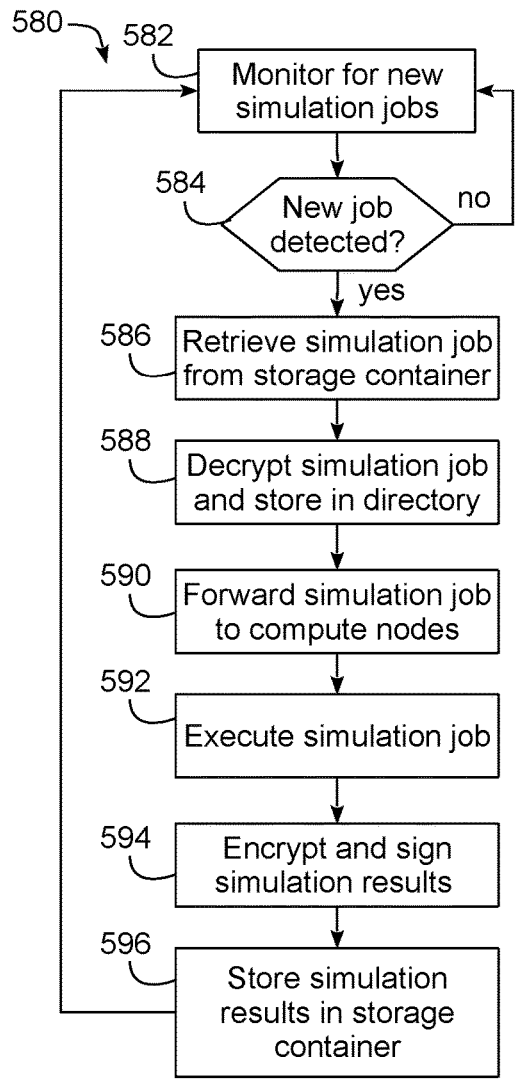
FIG. 10 illustrates a flowchart of an example sequence of operations for detecting and executing a submitted simulation job in the data processing system of FIG. 4.

FIG. 10 next illustrates an example sequence of operations 580 for detecting and executing a submitted simulation job in HPC cloud cluster 530, e.g., by head node 532. In particular, head node 532 may be configured to monitor the provisioned storage for the HPC cloud cluster for the presence of a storage container 538 with a pending simulation job (block 582). As illustrated in block 584, head node 532 waits until a new job is detected, and upon detecting a new job, block 586 retrieves the simulation job (e.g., simulation job 540) from storage container 538 (block 586), decrypts the simulation job and stores the decrypted data in directory 548 (block 588) forwards the simulation job to the compute nodes (block 590) and executes the simulation job, i.e., runs the reservoir simulation (block 592). Simulation results are stored in unencrypted format in the directory, so upon completion of the simulation, head node 532 encrypts and signs the simulation results (block 594) and stores the encrypted simulation results (e.g., simulation results 542) back in storage container 538 (block 596). Control then returns to block 582 to await other simulation jobs.

Figure 11:
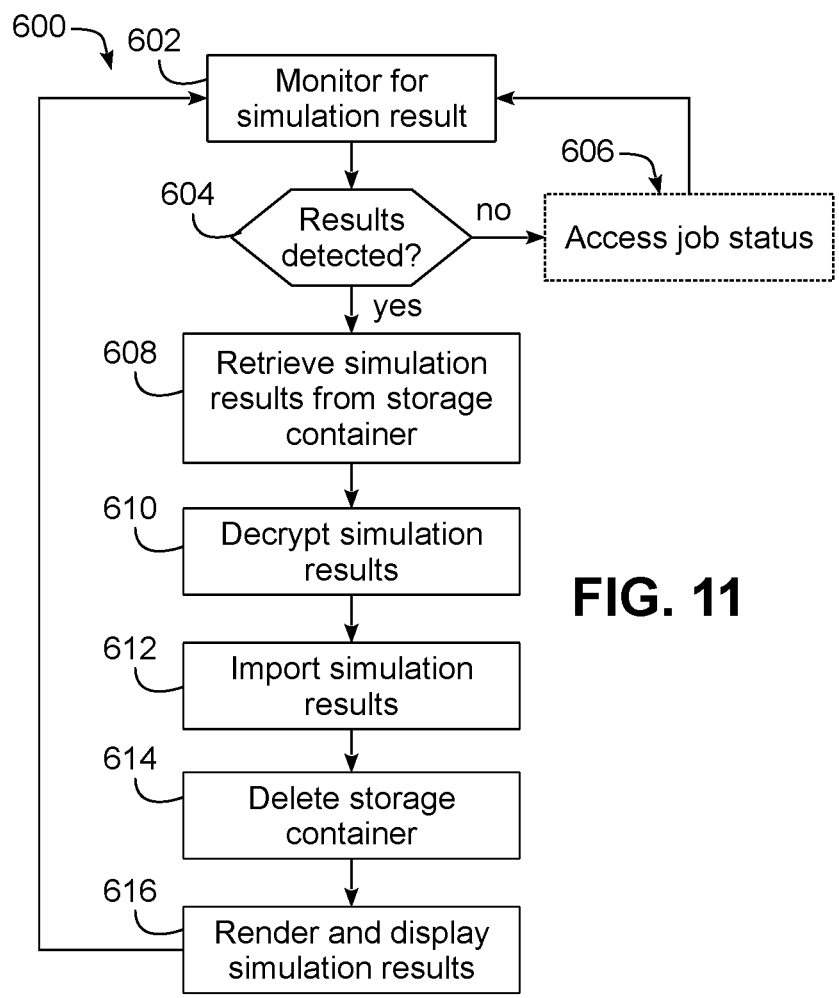
FIG. 11 illustrates a flowchart of an example sequence of operations for detecting and analyzing simulation results in the data processing system of FIG. 4.

FIG. 11 next illustrates an example sequence of operations 600 for detecting and analyzing simulation results, e.g., by pre/post-processor 410 of FIG. 4. Similar to head node 532, pre/post-processor 410 may monitor the provisioned storage for the HPC cloud cluster new simulation results (block 602). If results are not detected in block 604, control optionally passes to block 606 to access job status information, e.g., as may be supported by the cloud infrastructure and provided by job status monitor 550. Upon detecting new simulation results, block 608 retrieves the simulation results from storage container 538, block 610 decrypts the simulation results, and block 612 imports the simulation results into the graphical pre/post-processor for visualization, display or other analysis. Next, block 614 may delete the storage container in the HPC cloud cluster, which in some embodiments may include secure deletion and shredding of both the data stored in the storage container and the storage container itself. Thereafter, the graphical pre/post-processor renders and displays the simulation results to the customer, and then returns control to block 602 to monitor for other simulation results.

It will also be appreciated that in addition to encrypting simulation jobs and results, compression may also be used to reduce file transfer sizes. In addition, in other embodiments, simulation jobs and/or results may be pushed rather than relying on polling mechanisms as illustrated in FIGS. 10 and 11.

In addition, in some embodiments, upon termination of a customer subscription, an HPC cloud cluster may be deprovisioned, and in connection with such deprovisioning, all customer data, including all provisioned storage and each head and compute node, may be securely deleted. Further, in some embodiments, such deletion may occur after every simulation. Further, in some embodiments, customers may request to modify an HPC cloud cluster, e.g., to add or remove compute nodes or otherwise vary the performance and/or configuration of an HPC cloud cluster.

Of note, in some embodiments, the workflow utilized by the user of an E&P platform to submit simulation jobs and retrieve results to and from a provisioned HPC cloud cluster may be substantially the same from the user's perspective as the workflow used to submit simulation jobs and retrieve results with a local reservoir simulator or a private (in-house/non-cloud) HPC cluster. Further, in some instances, a user may be permitted to select from among different reservoir simulators as the target of a particular simulation job, and still interact with simulation models and results in substantially the same manner. As such, in some embodiments high performance computing resources, including supercomputer-level performance, may be available to customers on a subscription basis, thereby enabling larger and more complex reservoir simulations to be performed with reduced capital requirements and overhead that would otherwise be needed to support comparable customer-owned high performance computer systems. In addition, data security may be maintained in some embodiments to mitigate the risk of running a reservoir simulation on a provisioned HPC cloud cluster as opposed to a customer-owned computer system.

Although the preceding description has been described herein with reference to particular means, materials, and embodiments, it is not intended to be limited to the particular disclosed herein. Furthermore, while particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of running a reservoir simulation, comprising:
  receiving, with a high performance computing cloud cluster provisioned within a petro-technical cloud computing environment, a simulation job prepared by a graphical pre-processor resident on a computer system that is external to the petro-technical cloud computing environment, wherein the simulation job received by the high performance computing cloud cluster includes encrypted simulation job data;
  decrypting the encrypted simulation job data in the high performance computing cloud cluster prior to executing the simulation job to generate decrypted simulation job data, wherein the high performance computing cloud cluster includes a storage container within which is stored the encrypted simulation job data, wherein decrypting the encrypted simulation job data includes retrieving the encrypted simulation job data from the storage container and storing the decrypted simulation job data in temporary storage in the high performance computing cloud cluster;
  executing the simulation job using a reservoir simulator resident on a plurality of compute nodes in the high performance computing cloud cluster to generate simulation results;
  encrypting simulation result data from the simulation results prior to returning the generated simulation results such that returning the generated simulation results includes returning the encrypted simulation result data, wherein the simulation results are stored in the temporary storage by the plurality of compute nodes, and wherein encrypting the simulation result data includes retrieving the simulation result data from the temporary storage and storing the encrypted simulation result data in the storage container;

returning the generated simulation results to a graphical post-processor resident on the computer system that is external to the petro-technical cloud computing environment;

wherein the storage container is created in response to the computer system that is external to the cloud computing environment, and wherein the encrypted simulation job data is stored in the storage container by the computer system that is external to the cloud computing environment, the method further comprising:

monitoring the storage container for the encrypted simulation job data, wherein retrieving the encrypted simulation job data is performed in response to detecting, from the monitoring, the encrypted simulation job data in the storage container; and deleting the storage container after executing the simulation job and returning the generated simulation results.

2. The method of claim 1, wherein the graphical pre-processor and graphical post-processor are components of an exploration and production (E&P) software platform resident on the computer system, and wherein the computer system is a desktop computer system, a laptop computer system or a server computer system.

3. The method of claim 1, wherein receiving the simulation job includes receiving at least a portion of a simulation model prepared by the graphical pre-processor.

4. The method of claim 1, further comprising provisioning the high performance computing cloud cluster in the cloud computing environment in response to a request from the computer system that is external to the cloud computing environment.

5. The method of claim 4, further comprising creating a subscription for a user of the computer system that is external to the cloud computing environment, wherein provisioning the high performance computing cloud cluster is performed on behalf of the subscribed user.

6. The method of claim 5, further comprising, after provisioning the high performance computing cloud cluster, establishing a direct secure connection between the high performance computing cloud cluster and the computer system that is external to the cloud computing environment.

7. A method of running a reservoir simulation, comprising:

receiving, with a high performance computing cloud cluster provisioned within a petro-technical cloud computing environment, a simulation job prepared by a graphical pre-processor resident on a computer system that is external to the petro-technical cloud computing environment, wherein the simulation job received by the high performance computing cloud cluster includes encrypted simulation job data;

decrypting the encrypted simulation job data in the high performance computing cloud cluster prior to executing the simulation job to generate decrypted simulation job data, wherein the high performance computing cloud cluster includes a storage container within which is stored the encrypted simulation job data, wherein decrypting the encrypted simulation job data includes retrieving the encrypted simulation job data from the storage container and storing the decrypted simulation job data in temporary storage in the high performance computing cloud cluster;

executing the simulation job using a reservoir simulator resident on a plurality of compute nodes in the high performance computing cloud cluster to generate simulation results;

encrypting simulation result data from the simulation results prior to returning the generated simulation results such that returning the generated simulation results includes returning the encrypted simulation result data, wherein the simulation results are stored in the temporary storage by the plurality of compute nodes, and wherein encrypting the simulation result data includes retrieving the simulation result data from the temporary storage and storing the encrypted simulation result data in the storage container;

returning the generated simulation results to a graphical post-processor resident on the computer system that is external to the petro-technical cloud computing environment;

generating a simulation model and the simulation job using the graphical pre-processor;

encrypting data associated with the simulation job to generate the encrypted simulation job data;

creating the storage container;

storing the encrypted simulation job data in the storage container;

monitoring the storage container for the encrypted simulation result data;

detecting, from the monitoring, the encrypted simulation result data in the storage container;

receiving the encrypted simulation result data from the storage container;

decrypting the encrypted simulation result data to generate decrypted simulation result data;

deleting the storage container; and displaying at least a portion of the encrypted simulation result data.

8. An apparatus, comprising:

a high performance computing cloud cluster provisioned within a petro-technical cloud computing environment, the high performance computing cloud cluster including a plurality of compute nodes including hardware resources from the petro-technical cloud computing environment;

a reservoir simulator resident on the plurality of compute nodes;

program code configured upon execution by at least one processing unit resident in the petro-technical cloud computing environment to receive a simulation job prepared by a graphical pre-processor resident on a computer system that is external to the petro-technical cloud computing environment, initiate execution of the simulation job by the reservoir simulator to generate simulation results, and return the generated simulation results to a graphical post-processor resident on the computer system that is external to the petro-technical cloud computing environment;

wherein the received simulation job includes encrypted simulation job data, and wherein the program code is further configured to decrypt the encrypted simulation job data prior to initiating execution of the simulation job to generate decrypted simulation job data, and to encrypt simulation result data from the simulation results prior to returning the generated simulation results wherein the high performance computing cloud cluster includes a storage container within which is stored the encrypted simulation job data, wherein the program code is configured to decrypt the encrypted simulation job data by retrieving the encrypted simulation job data from the storage container and storing the decrypted simulation job data in temporary storage in the high performance computing cloud cluster, wherein the simulation results are stored in the temporary storage by the plurality of compute nodes, and wherein the program code is configured to encrypt the simulation result data by retrieving the simulation result data from the temporary storage and storing the encrypted simulation result data in the storage container; and wherein the program code is configured to monitor the storage container for the encrypted simulation job data, wherein the program code is configured to retrieve the encrypted simulation job data in response to detection, from the monitoring, of the encrypted simulation job data in the storage container, and wherein the storage container is configured to be deleted by the computer system that is external to the cloud computing environment after execution of the simulation job and return of the generated simulation results.

9. The apparatus of claim 8, wherein the simulation job includes at least a portion of a simulation model prepared by the graphical pre-processor.

10. The apparatus of claim 8, further comprising a management cloud resident in the cloud computing environment and configured to provision the high performance computing cloud cluster in response to a request from the computer system that is external to the cloud computing environment.

11. The method of claim 10, wherein the management cloud is further configured to create a subscription for a user of the computer system that is external to the cloud computing environment, wherein the high performance computing cloud cluster is provisioned on behalf of the subscribed user.

12. A program product, comprising:
a non-transitory computer readable medium; and
program code stored on the non-transitory computer readable medium and configured upon execution by at least one processing unit of a computer system that is external to a petro-technical cloud computing environment, the program code including a graphical pre-processor and a graphical post-processor that are components of an exploration and production (E&P) software platform resident on the computer system, and the program code configured to:
directly connect to a high performance computing cloud cluster provisioned within the petro-technical cloud computing environment, the high performance computing cloud cluster including a plurality of compute nodes and a reservoir simulator resident on the plurality of compute nodes;
generate and submit a simulation job to the high performance computing cloud cluster to cause the high performance computing cloud cluster to initiate execution of the simulation job by the reservoir simulator to generate simulation results;
receive and display the generated simulation results;
encrypt data associated with the simulation job to generate encrypted simulation job data;
create a storage container in the high performance computing cloud cluster;
store the encrypted simulation job data in the storage container;
monitor the storage container for encrypted simulation result data;
detect, from the monitoring, encrypted simulation result data stored in the storage container in response to execution of the simulation job by the reservoir simulator;
receive the encrypted simulation result data from the storage container;
decrypt the encrypted simulation result data to generate decrypted simulation result data;
delete the storage container; and
display at least a portion of the encrypted simulation result data.

13. The program product of claim 12, wherein the program code comprises first program code, the program product further comprising second program code configured upon execution by at least one processing unit in the high performance computing cloud cluster to receive the submitted simulation job, initiate execution of the submitted simulation job by the reservoir simulator to generate the simulation results, and return the generated simulation results.

14. The program product of claim 13, wherein the submitted simulation job includes encrypted simulation job data, and wherein the second program code is further configured to decrypt the encrypted simulation job data prior to initiating execution of the simulation job to generate decrypted simulation job data, and to encrypt simulation result data from the simulation results prior to returning the generated simulation results.

15. The apparatus of claim 14, wherein the high performance computing cloud cluster includes a storage container within which is stored the encrypted simulation job data, wherein the second program code is configured to decrypt the encrypted simulation job data by retrieving the encrypted simulation job data from the storage container and storing the decrypted simulation job data in temporary storage in the high performance computing cloud cluster, wherein the simulation results are stored in the temporary storage by the plurality of compute nodes, and wherein the second program code is configured to encrypt the simulation result data by retrieving the simulation result data from the temporary storage and storing the encrypted simulation result data in the storage container.

* * * * *